Patented Sept. 30, 1924.

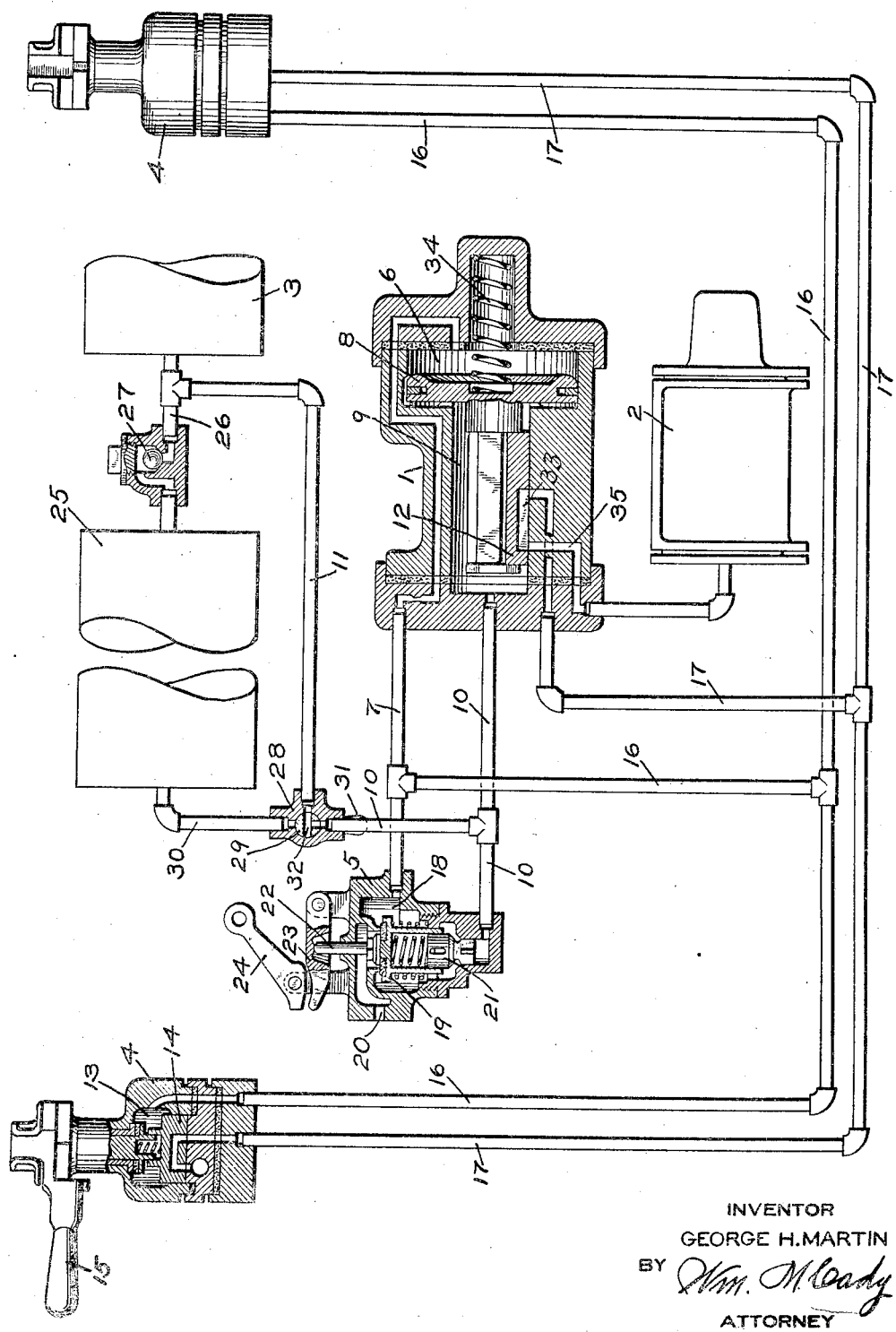

1,509,970

UNITED STATES PATENT OFFICE.

GEORGE H. MARTIN, OF NEWTONVILLE, MASSACHUSETTS, ASSIGNOR TO THE WEST-INGHOUSE AIR BRAKE COMPANY, OF WILMERDING, PENNSYLVANIA, A CORPORATION OF PENNSYLVANIA.

FLUID-PRESSURE BRAKE.

Application filed November 17, 1923. Serial No. 675,247.

To all whom it may concern:

Be it known that I, GEORGE H. MARTIN, a citizen of the United States, residing at Newtonville, in the county of Middlesex and State of Massachusetts, have invented new and useful Improvements in Fluid-Pressure Brakes, of which the following is a specification.

This case relates to fluid pressure brakes, and more particularly to a brake equipment employing an emergency valve device.

With brake equipments of the above character, the emergency valve device is operated upon a reduction in fluid pressure for supplying fluid from a main reservoir or other source of fluid pressure to the brake cylinder. If the pipe through which fluid from the main reservoir is supplied should break or should the compressor, which supplies fluid to the main reservoir, fail, no application of the brakes could be obtained by operation of the emergency valve device.

The principal object of my invention is to provide means for ensuring operation of the emergency valve device and an application of the brakes in case of loss of main reservoir pressure from any cause.

In the accompanying drawing, the single figure is a diagrammatic view, partly in section, of a fluid pressure brake equipment embodying my invention.

In order to illustrate one application of my invention, I have shown in the drawing a double end brake equipment comprising an emergency valve device 1, a brake cylinder 2, a main reservoir 3, and a brake valve device 4 at each end of the car.

The equipment shown is of the straight air type, in which the manipulation of the brake valve is only capable of effecting a straight air application and release of the brakes and in order to control the operation of the emergency valve device, a valve device 5 is provided, which may be operated by the conductor or a passenger on the car, for effecting the operation of the emergency valve device.

The emergency valve device 1 may comprise a casing having a piston chamber 6 connected to a control pipe 7 and containing piston 8 and having a valve chamber 9 connected through pipes 10 and 11 with main reservoir 3 and containing a slide valve 12 adapted to be operated by piston 8.

Each brake valve device 4 may comprise a casing having a valve chamber 13, containing a rotary valve 14 adapted to be operated by handle 15, the valve chamber 13 being connected to a pipe 16 leading to the pipe 7, and the rotary valve 14 being adapted to control the admission and release of fluid under pressure to and from a straight air pipe 17.

The controlling valve device 5 may comprise a casing having a valve chamber 18 containing a valve 19 for controlling the exhaust of fluid from chamber 18 and from the control pipe 7, which is open to said chamber, to an exhaust port 20. Mounted in a cylindrical extension of the valve 19 is a valve 21 which controls communication from pipe 10 to chamber 18.

The valve 19 is provided with a stem 22 adapted to engage a pivoted lever 23, said lever, and thereby the valve 19, being operated by the rocking of a cam lever 24.

According to my invention, an additional reservoir 25 is provided, which is adapted to be charged with fluid under pressure from the main reservoir 3 by way of pipe 26 containing a non-return check valve 27.

A cock casing 28 containing a cock 29 is connected to pipes 10 and 11 and a pipe 30 leading to the reservoir 25 and the cock 29 is provided with an operating handle 31. Normally the cock 29 occupies the position shown in the drawing, a three way passage 32 connecting pipe 11 to pipe 10. As the cock 29 is intended to be under the control of the motorman, the same is preferably located at some point in the car convenient for manipulation by the motorman.

In the normal release position of the emergency valve device 1, a cavity 33 in slide valve 12 connects the straight air pipe 17 with the brake cylinder 2, so that by manipulation of the brake valve 4 by the motorman, the brakes may be applied and released by straight air.

Normally, the valve device 5 is in the position shown, with valve 19 seated and valve 21 open, so that fluid under pressure is supplied from the main reservoir 3 through pipe 10 to valve chamber 18 and thence through pipe 7 to piston chamber 6 of the emergency valve device and since valve chamber 9 is open to main reservoir pipe 10, the fluid pressures on opposite sides of piston 8 are equalized, permitting the spring 34 to maintain piston 8 and slide valve 12 in the normal release position as shown in the drawing. The conductor or a passenger in the car may make an emergency application of the brakes when necessary by operating the handle 24, so as to depress the stem 22 and thereby push valve 19 from its seat. At the same time, the movement of valve 19 operates to cause the valve 21 to seat, thus cutting off the flow of fluid from the main reservoir to piston chamber 6. The opening of valve 19 permits the venting of fluid from piston chamber 6 through pipe 7 to exhaust port 20, so that piston 8 is moved by main reservoir pressure in valve chamber 9 to emergency position. In this position, slide valve 12 uncovers passage 35, permitting flow of fluid from the valve chamber 9 and the main reservoir 3 to brake cylinder 2, so as to effect an emergency application of the brakes.

If the main reservoir pipe 11 or pipe 10 should break, or if the pressure in the main reservoir should fail, it will be evident that the brakes can not be applied upon operation of the lever 24, since the emergency valve device 1 would not then be operative, nor can the motorman make a straight air application of the brakes, since the usual main reservoir supply has failed.

In such case, according to my invention, an emergency application of the brakes may still be obtained by the motorman by turning the cock 29 so that the passage 32 connects pipe 30 with pipe 10, at the same time cutting off communication to pipe 11.

As the additional reservoir 25 was previously charged from the main reservoir 3 past the non-return check valve 27, it will be seen that when the cock 29 is turned as above indicated, fluid under pressure will be supplied from reservoir 25 to pipe 10 and thence to valve chamber 9. Piston chamber 6 is now at a reduced pressure due to the failure of main reservoir pressure and consequently, fluid supplied by the operation of the cock 29 to valve chamber 9 will effect the shifting of piston 8 and slide valve 12 to emergency position. In emergency position, fluid is supplied from valve chamber 9 and the additional reservoir 25 to the brake cylinder 2, to effect an emergency application of the brakes.

Having now described my invention, what I claim as new and desire to secure by Letters Patent, is:—

1. The combination with a source of fluid under pressure and an emergency valve device operated upon a reduction in fluid pressure for supplying fluid from said source to effect an application of the brakes, of an additional source of fluid pressure and means for connecting said additional source of fluid pressure to the emergency valve device upon failure of supply from the first source of pressure.

2. In a fluid pressure brake, the combination with a main reservoir and an emergency valve device for normally supplying fluid from said reservoir to effect an application of the brakes, of an additional reservoir, and means for controlling communication from both reservoirs to said emergency valve device.

3. In a fluid pressure brake, the combination with a main reservoir and an emergency valve device for normally supplying fluid from said reservoir to effect an application of the brakes, of an additional reservoir and valve means having one position for connecting the main reservoir to said emergency valve device and another position in which said additional reservoir is connected to the emergency valve device.

4. In a fluid pressure brake, the combination with a source of fluid pressure and an emergency valve device normally subject on one side to fluid under pressure supplied from said source, of an additional source of fluid under pressure and valve means operable to cut off communication from the first source of pressure to the emergency valve device and open communication from the additional source of pressure to said valve device.

5. In a fluid pressure brake, the combination with a main reservoir and an emergency valve device having a piston and a valve operated by said piston for supplying fluid under pressure to effect an applicaiton of the brakes, of an additional reservoir charged with fluid under pressure and a valve having one position for connecting the main reservoir to one side of said piston and another position for connecting the additional reservoir to said piston and at the same time cutting off communication from the main reservoir.

6. In a fluid pressure brake, the combination with a main reservoir and an emergency valve device having a piston and a valve operated by said piston for supplying fluid under pressure to effect an application of the brakes, of an additional reservoir connected to and charged with fluid under pressure from said main reservoir, a check valve for preventing back flow from said additional reservoir to the main reservoir, and a manually operable cock for connecting the main reservoir to one side of said piston in one position and the additional reservoir in another position.

In testimony whereof I have hereunto set my hand.

GEO. H. MARTIN.